United States Patent [19]
Wiklund

[11] 3,963,356
[45] June 15, 1976

[54] OPTICAL SIGHT

[75] Inventor: Klas Rudolf Wiklund, Taby, Sweden

[73] Assignee: AGA Aktiebolag, Lidingo, Sweden

[22] Filed: Dec. 5, 1974

[21] Appl. No.: 529,920

[30] Foreign Application Priority Data
Dec. 11, 1973 Sweden............................. 7316669

[52] U.S. Cl................................. 356/251; 33/241; 350/174
[51] Int. Cl.²........................................ G02B 27/34
[58] Field of Search.............. 33/241, 287; 240/2 F, 240/6.41; 350/10, 174; 356/247, 251

[56] References Cited
UNITED STATES PATENTS

| | | |
|---|---|---|
| 2,874,605 | 2/1959 | Williamson.......................... 356/251 |
| 3,565,539 | 2/1971 | Russa.................................. 356/251 |
| 3,833,799 | 9/1974 | Audet................................ 33/241 X |

Primary Examiner—John K. Corbin
Assistant Examiner—Matthew W. Koren
Attorney, Agent, or Firm—Lerner, David, Littenberg & Samuel

[57] ABSTRACT

An optical sight, which includes a light source and a lens system wherein the lens system is an image of the light source, serving as an aiming point to the pointer's eye. The lens system has a reflecting surface for reflection in the direction of the pointer's eye of radiation from the light source. Means are provided for making a periodic change of the luminance of the image of the light source with a frequency with the perceptibility range of the eye.

6 Claims, 5 Drawing Figures

OPTICAL SIGHT

BACKGROUND OF THE INVENTION

Optical sights are known which comprise a light source and a lens system, wherein the lens system gives an image of the light source, serving as aiming point to the pointer's eye. The lens system has a reflecting surface for reflection of the radiation from the light source towards the pointer's eye.

Devices of the type utilized in the invention are particularly suited for use as sights for firearms. In prior art devices it was known how to arrange a lens, serving as a semi-transparent concave mirror, and a light source, placed in the focus of the mirror, so that the main axis of the lens is halfway between the pointer's aiming line and a line between the light source, secured to the device, and the center of the lens.

In these devices, generally a bulb or a light emitting diode is used as a light source. It may be difficult to perceive the image of the light source against certain backgrounds and this is especially true with regard to red light emitting diodes when the weapon is to be sighted at a red background.

SUMMARY OF THE INVENTION

According to the invention, an improved discernment of the aiming point will be attained, if the aiming point includes an effect that is perceived as pulsating or flashing. A further improvement of the optical sight will be obtained, if this luminance variation is assigned an upper and/or lower limit as well and is arranged to vary depending on the ambient light conditions.

The above-mentioned aiming point consists of an image of the light source on a reflecting surface in the lens system of the sight. To increase the perceptibility of this image of the light source and/or adjust its luminance to the ambient light conditions, the following embodiments are possible.

a. The image of the light source is arranged so that it is perceived as flashing or pulsating with a fixed frequency. This is most easily attained by making the light source emit pulsating or flashing light. The flashing mode can be achieved by having the light source alternate between an on and off state. It is even possible for the light source to alternate between two on states but with different luminance. The shift between the two conditions is rapid. With a pulsating light source the luminance varies slowly from an upper to a lower limit. The lower limit can be set so that it is perceived by the eye as totally switched off. It can further be mentioned here that a considerable saving of energy is achieved which is particularly advantageous in battery operation.

b. The flashing or pulsating, according to alternative (a) can change its frequency depending on the ambient light. The frequency should be made lower in weaker light conditions in this alternative.

c. The flashing or pulsating occurs at a fixed frequency but the switched on state or the upper limit of the luminance in the light source and the lower limit of the luminance in the light source, when this is not perceived as switched off, vary depending on the ambient light conditions in such a way that the limits are lower in weaker light conditions.

d. The flashing or pulsating mode has a frequency which changes depending on the ambient light conditions at the same time as the variation of the luminance also changes, according to alternative (c).

The flashing or pulsating in the light source should by daylight have as high a frequency as possible without being perceived by the eye as fixed light. This upper limit varies somewhat with different persons and in different conditions of tiredness, but generally it lies somewhere between 10 and 20 Hz. To give a good perceptibility of the flashing from the light source even in weaker ambient light conditions the frequency of the flashing should under such conditions be somewhat reduced.

When shooting in the direction of a moving target it is e.g. possible to have a flashing frequency of about 10 Hz by full daylight but this frequency can be reduced to about 5 – 6 Hz in weak light conditions. How much it is possible to reduce the frequency is, of course, determined by the rapidity of the type of target to be fired at. It is self evident that the more rapid the target to be fired at, the higher the lowest frequency must be to make perfect aiming possible.

When shooting in the direction of a stationary target, e.g., shooting in a rifle range, the flashing frequency can be relatively low. If the frequency goes down under 1 Hz, however, it is considered to be useless. In bad light conditions when shooting in a rifle range the flashing frequency should be between 2 and 4 Hz, the lowest useful range of frequencies.

The reason for reducing the frequency on the whole in bad light conditions is that the perceptibility of the target and aiming point in bad light conditions will not be optimal if too high a frequency is assigned the aiming point.

To combine the flashing or pulsating mode in the light source with a variable upper limit of the luminance in the light source is an advantage, as the risk of dazzling thereby can be eliminated. The light source should emit a relatively high luminance by full daylight so that the aiming point can be perceived clearly by the eye. In the cases when the lower limit of pulsating or flashing in the light source is not perceived as totally switched off, even this limit should be reduced so that the difference between upper and lower limit of luminance in the light source will be clearly visible to the eye.

Although this invention will be described with respect to its preferred embodiments, it should be understood that many variations and modifications will be obvious to those skilled in the art, and it is preferred, therefore, that the scope of the invention be limited, not by the specific disclosure herein but only by the appended claims.

DETAILED DESCRIPTION OF THE DRAWINGS

The apparatus according to the invention will be described in greater detail in connection with the accompanying drawings in which FIG. 1 shows an embodiment of an optical sight utilizing the present invention.

FIG. 2 is supplemented with the circuit of FIG. 3, a varying flashing frequency can be obtained.

Figure 1:
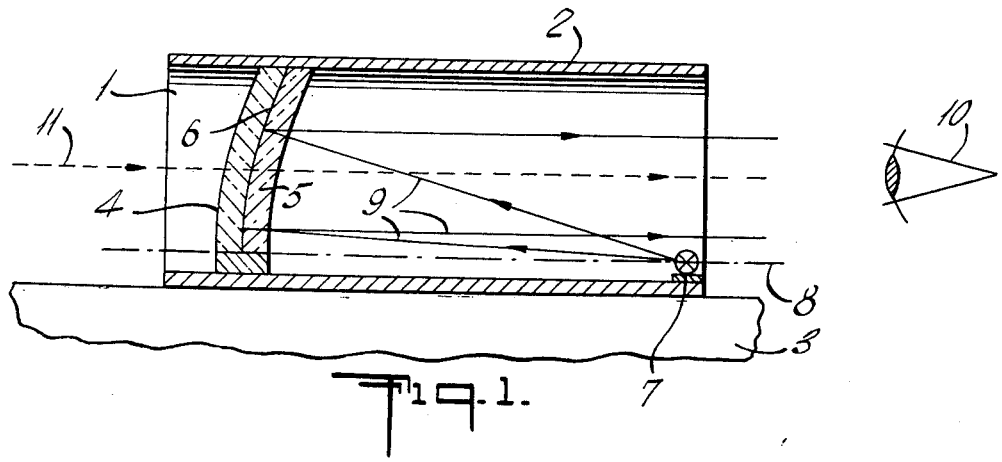

In FIG. 1 the optical sight is denoted 1. This is e.g. enclosed in a tube 2, which is directly mounted to the weapon or instrument 3, which is to be aimed at a target. The lens system of the device consists of two composite lenses. A first lens is denoted 4 and a second lens 5, said lenses being arranged tight together with the composed lens surface 6 between them. The lenses may be glued.

This composed lens surface is reflecting light coming from a light source 7. Reflection can also be achieved by the fact that the first and second lens have different refractive indexes with respect to each other, or more appropriately, that the composite lens surface is equipped with a reflecting coating.

The lens system 4 and 5 has an optical axis, denoted 8, upon which the light source 7 is located. The optical axis 8 is parallel to the barrel of the weapon or to the activity direction of the instrument. Light beams 9 from the light source 7 are reflected against the coating 6 towards the pointer's eye 10 in such a way that the light from the reflective coating is parallel in the direction of the eye, whereby the eye perceives the light source as being infinitely far away. The lens system with the reflecting coating is designed so that beams from the target 11 fall through the eye, i.e., the lens system has transparency.

Figure 2:
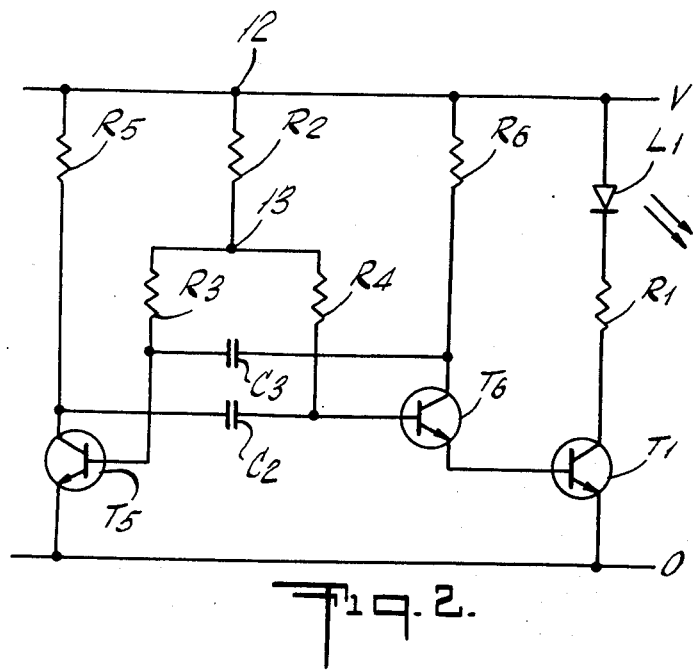
FIG. 2 shows a circuit to obtain a flashing aiming point. If

The circuit of FIG. 2 shows an example of how it is possible to flash the light source 7 of FIG. 1. In this embodiment it has been assumed that the light source 7 consists of a light emitting diode $L_1$. This light emitting diode is connected to a power source V in series with a resistance $R_1$ and the emitter-collector of a transistor $T_1$.

The transistor $T_1$ makes the light emitting diode flash by alternately switching off and on the circuit via the light emitting diode.

The flashing depends on the base control of the transistor $T_1$. The base is connected to an astable flip-flop, consisting of two transistors $T_5$ and $T_6$ connected to the power source V across their respective resistors $R_5$ and $R_6$. The base of the transistor $T_6$, the emitter of which is connected to the transistor $T_1$ in the light emitting diode circuit, is connected across a capacitor $C_2$ to the collector of the other transistor, included in the flip-flop and across the resistors $R_2$, $R_4$ to the power source V. The base of the transistor $T_5$ is connected across a capacitor $C_3$ to the collector of the other transistor $T_6$ and across the resistors $R_2$, $R_3$ to the power source V.

The flashing frequency of the light emitting diode $L_1$ is, in principle, determined by the resistor $R_3$ in combination with the capacitor $C_3$. The resistor $R_1$ in series with the light emitting diode determines the maximum current through this diode.

Figure 3:
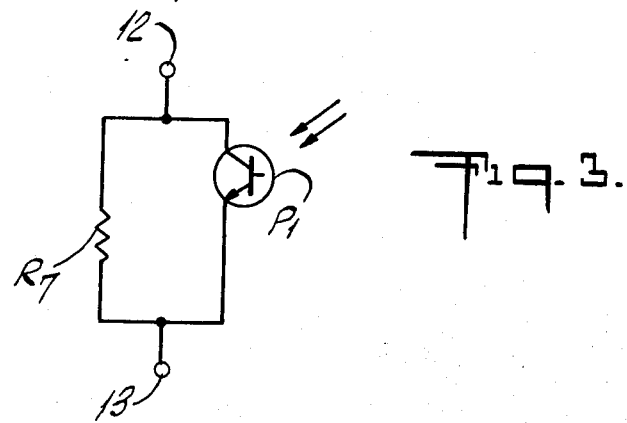

It has been mentioned previously that it may be desirable to vary the flashing frequency of the light emitting diode depending on the ambient light conditions. If instead of the resistor $R_2$ the circuit of FIG. 3 is placed between the points 12 and 13 of FIG. 2, the result will be that the shift of the astable flip-flop will vary depending on the incident light on a photo transistor $P_1$ in the circuit of FIG. 3. A resistor $R_7$ is connected in parallel with this photo transistor $P_1$. The purpose of this resistor is to guarantee a certain basic current to the flip-flop at very weak illumination on the photo transistor. This serves to prevent the flip-flop from stopping totally or from falling below a certain minimum frequency when the ambient light is very weak.

Figure 4:
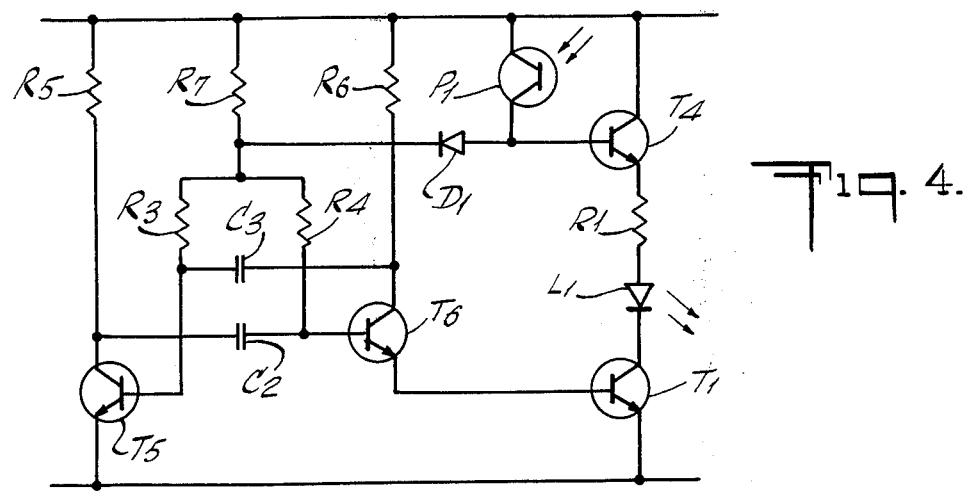
FIG. 4 shows an embodiment in which both variation of the flashing frequency and variation of the luminance of the light source is obtained.

In FIG. 4 there is shown, as an example, a circuit which causes on the one hand the flashing frequency of the light source, in this case the light emitting diode, to vary with the ambient light, and on the other which causes the luminance of the light source to vary with the ambient light.

The circuit is, in principle, a combination of the circuits of FIGS. 2 and 3. The photo transistor also controls the current through the light emitting diode $L_1$ via a transistor $T_4$, working as an emitter follower. Of course, it is possible to change the circuit of FIG. 4 so that the photo transistor $P_1$ does not influence the astable flip-flop but only by means of the transistor $T_4$ influences the light emitting diode $L_1$ for variation of the luminance depending on the ambient light. The purpose of the diode $D_1$ is to block the current supply to the transistor $T_4$ across the resistor $R_7$ in weak light on the photo transistor $P_1$.

It is also possible to accomplish in many different ways the embodiments of circuit connections shown in the figures to attain flashing and variation of the luminance of the light emitting diode. A number of the different types of integrated circuits in the open market can, for instance, be used.

It may be mentioned here as an example that Texas Instruments circuit Ser. No. 7413, comprising two Schmitt trigger circuits, can be used with advantage as flashing device for a light emitting diode. The light emitting diode is connected in series with a limiting resistor to the exit of the circuit while the circuit is fed back with a resistor. Further an exterior capacitor is connected. Thereby the capacitor and the resistor determine the flashing frequency.

Figure 5:
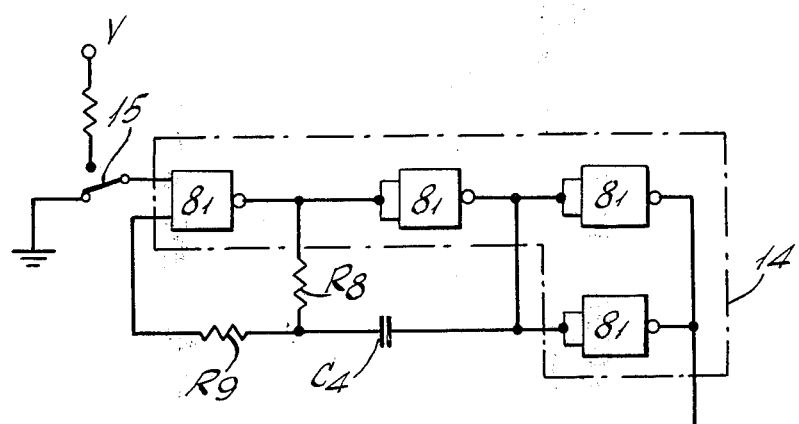
FIG. 5 shows another embodiment of a device according to the present invention.
Figure 5:
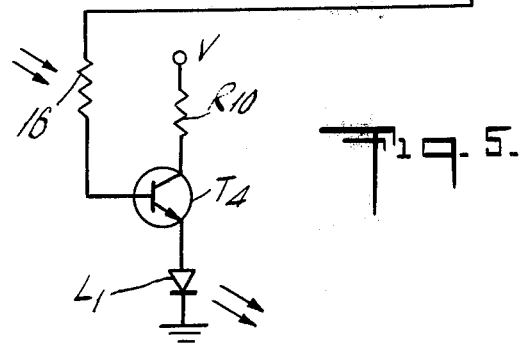

FIG. 5 shows how it is possible to produce a flashing of the light emitting diode by means of a C-Mos-logic. In this example the light emitting diode has a fixed flashing frequency but its luminance in the on condition varies depending on the ambient light.

In the example according to FIG. 5, the C-Mos-logic CD 4011 AE produced by RCA, has been chosen. This circuit is denoted 14 in FIG. 5 and the resistors R8, R9 and the capacitor C4 are connected to the circuit. The resistor can, for instance, have a value of 100 kohm and the capacitor, for instance, 2.2μF. This circuit gives a flashing frequency $f$ which is about $f = 1/RC \cdot 1.23$ where thus R = 100 KΩ and C = 2.2 μF in this case. The values inserted give a flashing frequency of about 6 Hz. The circuit is started by means of the switch 15. It is notable that within the block 14 some of the inputs of the nandcircuits have been connected in parallel by means of exterior connections. To give a stronger driving of the exterior elements, fed by the logic circuit, two output terminals of the nand-circuits have been connected to feed these elements. The exterior elements comprise a photo-sensitive element 16 which in the figure is a photo resistor of, for instance, cadmium sulphide, a transistor $T_4$ working as an emitter follower and a light emitting diode $L_1$. The light emitting diode is further connected in series to a limiting resistor $R_{10}$. The photo resistor thus controls the voltage to the light emitting diode, whereby a variation in luminance of the light emitting diode depending on the ambient light is obtained.

As stated previously, the frequency of the flashings in the light source can be lower when a weapon or instrument is aimed at a stationary target than when it is aimed at mobile targets. This change of frequency can be regulated manually by means of a switch which connects different resistors and capacitors in the embodiments shown in the drawing in a way obvious to a man skilled in the art.

Of course, as is easily realized, there can be switches by means of which the changes in flashing frequency depending on the ambient light conditions and/or luminance indicated by the light source do not appear but instead are replaced by constant flashing frequency and/or luminance chosen in advance.

Another embodiment uses a variable proportion depending on the ambient light conditions between the on-and-off periods within a period of flashing in the light source. This gives an effect which is perceived by the eye as similar to the one obtained by variation of the luminance owing to variation of the current through the light source. It is even possible to use a variation of the above-mentioned proportion as well as a variation of the current through the light source.

Although this invention has been described with respect to its preferred embodiments, it should be understood that many variations and modifications will now be obvious to those skilled in the art, and it is preferred, therefore, that the scope of the invention be limited, not by the specific disclosure herein but only by the appended claims.

What is claimed:

1. An optical sight including a light source and a semi-transparent lens system wherein the lens system gives an image of the light source, serving as an aiming point, said lens system having a reflecting surface for reflection of said image in the direction of a pointer's eye, and means for periodically changing the luminance of the image of the light source with a frequency within the perceptibility range of the eye.

2. An optical sight in accordance with claim 1, wherein the frequency of the periodic change is just below the upper limit of said perceptibility range of the eye.

3. An optical sight in accordance with claim 1, including ambient light controlling means for controlling the periodic change of the luminance to vary depending upon the ambient light conditions in a manner wherein the frequency of said periodic change is lower in weaker light conditions.

4. The optical sight in accordance with claim 3, wherein said ambient light controlling means includes a photoelectric device sensitive to ambient light conditions, said photoelectric device being operative to control said light source.

5. An optical sight in accordance with claim 3, wherein said means for controlling periodic change in the luminance of the image of the light source includes means for varying the luminance in accordance with ambient light conditions in a manner such that the luminance is lower in weaker light conditions.

6. The optical sight in accordance with claim 1, wherein said means for controlling periodic change in the luminance of the image of the light source is operative to vary the luminance of the light source depending upon ambient light conditions in such a way that the luminance is lower in weaker light conditions.

* * * * *